(No Model.)
J. A. GALLAGHER.
TWO WHEELED VEHICLE.
No. 331,957. Patented Dec. 8, 1885.
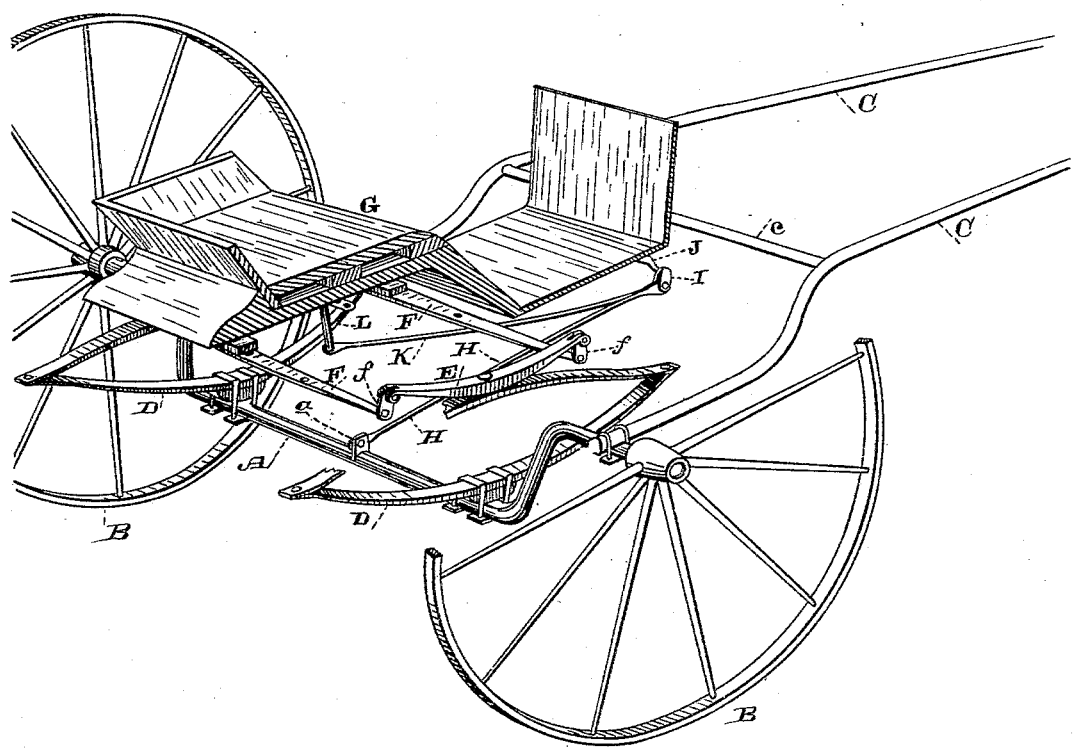
Witnesses,
Geo. H. Strong.
J. H. Fouske.
Inventor,
J. A. Gallagher
By
Dewey & Co.
Attorneys

UNITED STATES PATENT OFFICE.

JOHN AMBROSE GALLAGHER, OF STOCKTON, CALIFORNIA.

TWO-WHEELED VEHICLE.

SPECIFICATION forming part of Letters Patent No. 331,957, dated December 8, 1885.

Application filed May 18, 1885. Serial No. 165,924. (No model.)

*To all whom it may concern:*

Be it known that I, JOHN A. GALLAGHER, of Stockton, San Joaquin county, State of California, have invented an Improvement in Two-Wheeled Vehicles; and I hereby declare the following to be a full, clear, and exact description of the same.

My invention relates to the class of two-wheeled vehicles commonly known as "carts;" and my invention consists in an extensible pivoted connection between a loosely-hung, swinging, or pivoted body, and the axle, by which the body is prevented from moving back and forth, while the springs are allowed to have their own proper spring action, and also the teetering motion received from the shafts without transmitting said motion to the body.

The object of my invention is to overcome the unpleasant motion of a cart. This motion is the result of the jogging of the horse, communicated through the shafts and axle of the body. There being but a single axle in vehicles of this class, and the shafts being necessarily secured rigidly to the axle, (or, if not so secured, the body being required to have some limiting or fixed connection to prevent its turning over,) it follows that the motion of the shafts is communicated directly or indirectly to the body. By simply hanging the body loosely on its springs or otherwise pivoting it the object in view is not entirely attained, because while counteracting some of the motion which it would otherwise receive it has still a tendency to move back and forth with the teetering motion of the springs which support it. My invention contemplates such a connection between the loosely-suspended or pivoted body and axle, by which, while the springs are given their freedom of motion, the body is prevented from moving back and forth with them, although it moves up and down with the spring action.

Referring to the accompanying drawing, the figure is a perspective view of my cart, the body being cut away longitudinally to show the parts underneath and a portion of the rear side spring being also broken away.

A is the axle, and B the wheels, of a vehicle. Clipped rigidly to the axle are the shafts C, having the usual cross-bar, c. D are the elliptical side springs, clipped rigidly to the axle. On the top of these are clipped the spring-bars E. F are the body cross bars or loops, the ends of which are connected by pivoted links *f* to the ends of the spring-bars. The body-bars are pivoted in these links, and the links themselves are pivoted in the spring-bars, whereby a double pivot-joint is formed. G is the body, of any suitable pattern. This is bolted to the body bars or loops F. Now, it will be observed that the body, though suspended loosely and adapted to counteract partially the oscillating or teetering motion of the springs, will still have a motion forward and back, on account of having nothing to steady or guide it, and because the pivot-joints will frequently cramp or jam, and thus become rigid connections. To prevent this motion, I have the following: Pivoted to a short arm, *a*, on the axle is a brace-bar, H, extending forwardly and inclining upwardly and pivoted at its forward end to the lower ends of a projecting bracket, I. In the upper end of the projecting bracket is rigidly secured an arm, J, which is bolted solidly under the forward portion of the body. Pivoted in the lower end of the link is a brace-bar, K, which extends backwardly and inclines upwardly, and has rigidly secured to its rear end the arm L, which is bolted solidly to the body. It will be observed that by means of this connection with the axle the body is prevented from swinging back and forth, but still is allowed to move up and and down to receive the necessary spring by reason of the pivot-connections of the brace-bars with the link and the axle. The springs themselves have a tilting motion derived from the shafts, but without communicating it to the body, which, by being secured on the pivoted cross-bars F, does not interfere with said motion. The springs also have their usual action, which the body is adapted to receive by reason of the extensible brace-connection, and yet is prevented from moving back and forth.

Although I have herein shown a dropped axle, which necessitates an upwardly-extending arm, *a*, to which to pivot the brace-bar H, I can use a straight axle, in which case I would have a forwardly or backwardly extending arm for the pivot-connection, the object being merely to get at the center of pivotal action.

Having thus described my invention, what I claim as new, and desire to secure by Letters Patent, is—

1. In a two-wheeled vehicle, and in combination with the loosely-suspended or pivoted body, the forwardly-converging brace-bars H and K, pivoted to the axle and rigidly secured under the body respectively, and the projecting bracket I, pivoted to the forward ends of the two bars and secured solidly under the forward portion of the body, substantially as herein described.

2. In a two-wheeled vehicle, and in combination with the loosely-suspended or pivoted body G, the brace-bar H, pivoted at its rear end to the axle, the projecting bracket I, pivoted at its lower end to the forward end of the bar H, the arm J, bolted rigidly under the forward portion of the body and in the upper end of the link, the brace-bar K, pivoted in the lower end of the link, and the arm L, bolted rigidly under the body and to the rear end of the brace-bar K, substantially as herein described.

3. In a two wheeled vehicle, the wheeled axle A, the shafts C, side springs, D, and spring-bars E, as herein described, in combination with the body G, the body bars or loops F, the links $f$, pivoted to the body-bars and the spring-bars, the brace-bars H, pivoted on the axle, the brace-bar K, rigidly secured to the body, and the projecting bracket I, pivoted to the forward ends of the two brace-bars and secured rigidly under the forward portion of the body, substantially as herein described.

In witness whereof I have hereunto set my hand.

JOHN AMBROSE GALLAGHER.

Witnesses:
MATTHEW McCARTY,
JAS. M. McCARTY.